March 2, 1965　　P. G. BRUNDELL ETAL　　3,171,455
ROTOR FOR A LOG DEBARKING MACHINE
Filed April 23, 1962　　2 Sheets-Sheet 1

March 2, 1965   P. G. BRUNDELL ETAL   3,171,455
ROTOR FOR A LOG DEBARKING MACHINE
Filed April 23, 1962   2 Sheets-Sheet 2

United States Patent Office 3,171,455
Patented Mar. 2, 1965

3,171,455
ROTOR FOR A LOG DEBARKING MACHINE
Per Gunnar Brundell, Tolffors, Gavle, and Karl-Erik Arnold Jonsson, Gavle, Sweden, assignors to Söderhamns Verkstäder A.B., Soderhamn, Sweden, a corporation of Sweden
Filed Apr. 23, 1962, Ser. No. 189,465
Claims priority, application Sweden, May 10, 1961, 4,942/61
4 Claims. (Cl. 144—208)

The invention relates to debarking machines of the type in which debarking tools are carried by a hollow rotor to remove bark from the surface of a log fed axially through the rotor. In a machine to which the invention especially refers, the tools are placed at the inlet end of the rotor, and each tool is fixed to a shaft journalled in the rotor in parallel to its axis, said shafts being equally spaced around the rotor periphery. Further, resilient means are connected to the shafts to cause the tools to engage the log resiliently.

The object of the invention is to provide a rotor constructed such that the whole machine may be given a compact design, as seen in axial direction, whereby the machine will be useful for debarking even rather short lengths of logs. For that purpose, the interior wall of the rotor is widened conically onto the inlet end except for rib-like bulges enclosing the shafts of the debarking tools and extending substantially axially from the smallest periphery of the conical wall. Preferably said bulges are designed in such a way that said shafts will be located within the greatest periphery of the conical wall.

Such a rotor has the advantage that feed rollers or other feed means may without risk of clogging be placed very close to the inlet end, as will be explained more in detail hereinafter, and hereby also short logs may be guided effectively at their passage through the rotor. For the same purpose, i.e. for obtaining a compact machine, a pulley connected to the rotor and driven from a motor is preferably located radially outside a stator, in which the rotor is journalled. The pulley and the rotor are then connected by means of an annular flange projecting radially from the rotor.

The invention will be described more in detail with reference to the drawings which show a preferred embodiment:

Figure 1:
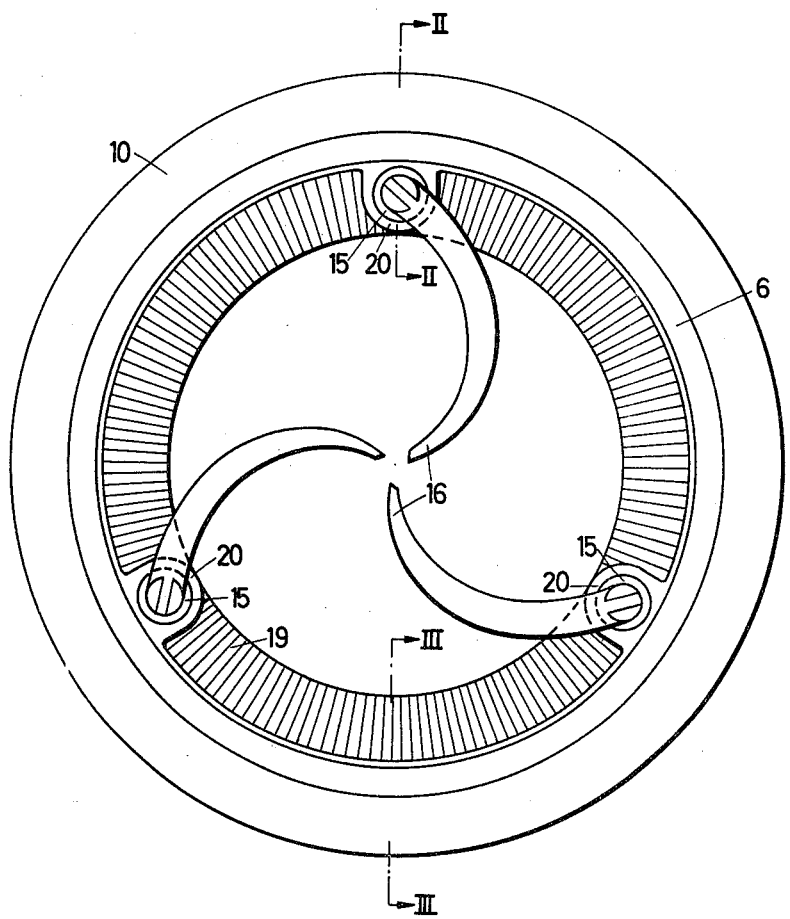
FIGURE 1 is a diagrammatic front view of the rotor and the surrounding stator.

A stator carried by a support or frame not shown is composed of two annular members 5 and 6 connected to each other by threads. A rotor 4 is journalled in the stator by means of a wire ball bearing 7 of a type known per se. At its rear side or outlet end the rotor 4 has a ring 8 extending radially outwards and carrying a pulley 9 at its outer periphery. The pulley 9 is located outside the stator member 5 with clearance in relation to it. The pulley 9 is in turn enclosed with clearance by a casing formed by a cylindrical wall 11 and a sheet metal ring 10 connecting the fore end of the stator member 5 to an adjacent end of the cylinder 11. The casing 10, 11 is mounted in the support or frame mentioned above and thus it carries the stator as well as the rotor journalled therein. Of course, the cylindrical wall 11 must be provided with openings for one or more belts 12 which connect the pulley 9 with a motor not shown. Alternatively, the wall 11 may have a semi-cylindrical shape only, as the pulley may be enclosed in a box-like frame along about half of its periphery.

The hollow rotor 4 carries three shafts 15 equally spaced around the periphery and directed in parallel to the axis of the rotor. Each shaft 15 is journalled in two spaced bearings 13 and 14 and projects at both ends of the rotor. At the inlet end of the rotor each shaft 15 has mounted thereon a debarking tool 16 directed inwards, and the opposite end of each shaft is connected to a crank 17 (FIG. 2) carrying a pin 18 at its free end. Though not shown, a similar pin projects from the rotor ring 8, and resilient means, such as one or more belts of rubber, are intended to connect the two pins in such a way that the crank 17 strives to rotate the debarking tool 16 inwardly onto the rotor axis. This mounting of the tools is previously known per se.

Figure 2:
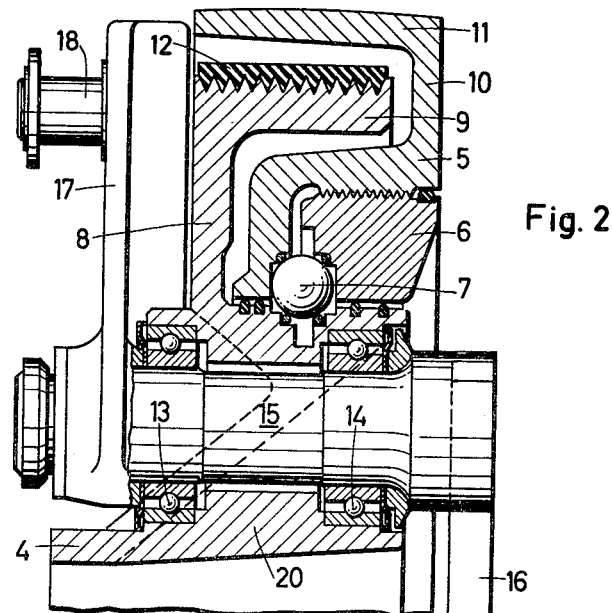
FIGURE 2 is a cross section on the line II—II in FIGURE 1.
Figure 3:
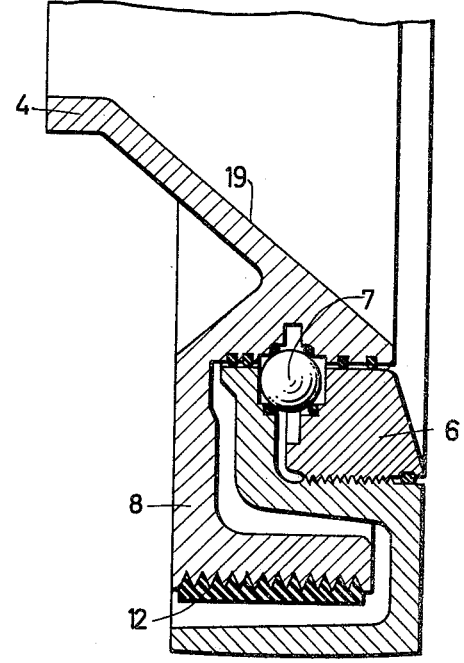
FIGURE 3 is a cross section on the line III—III in FIGURE 1.

The interior wall 19 of the rotor is shaped as a funnel widening onto the inlet end of the rotor, as is shown in FIG. 3 and by a dotted line also in FIG. 2. The cone angle is preferably between 70 and 100°. At three points equally spaced along the periphery the conical shape is, however, interrupted by rib-like bulges 20 extending substantially axially from the outlet end of the rotor and serving as holders for the bearings 13, 14 of the shafts 15 (FIG. 2). As shown, the bulges 20 are dimensioned to lie entirely outside the inner periphery at the outlet end of the rotor, so that they do not reduce the cross section area of the passage. Preferably the bulges are dimensioned such that the shafts 15 will be located quite inside the greatest periphery of the conical interior wall 19, as appears from FIG. 2.

The purpose of this shape of the rotor is as follows:
When very short logs are to be debarked, it is necessary to place the conveyors or feed rollers immediately in front of the debarking tools, as otherwise such logs will not be guided effectively during their passage through the rotor. On the other hand, it is also often desired to debark rather thick logs, and in this respect the inner diameter of the rotor only involves a limitation. If now a log of a maximum diameter is fed into a cylindrical rotor from feed means placed close to the tools, the annular space between the log surface and the interior wall of the rotor at its inlet end will be insufficient to receive the bark peeled off, and thereby the bark will get a tendency to be jammed between the tools and adjacent end of the stator, whereby the rotor will be subjected to high stresses. This inconvenience is eliminated by the new rotor in which the funnel shaped inlet opening compensates for a failing space in front of the rotor, thus making it possible for the bark peeled off to be distributed around the log before it is thrown away by the centrifugal force.

For a rotor dimensioned to receive logs of a certain predetermined optimal diameter the funnel shape described thus provides an additional clearance, whereby the accessible cross section area can be utilized effectively, and this has been made possible within unchanged dimensions of the outer periphery of the rotor.

It is to be noted that the location of the driving pulley described above serves the same purpose as the conical shape of the interior of the rotor, i.e. to facilitate barking of short logs. In the prior art, the pulley has generally been fixed to the rear end of the rotor, whereby the axial extent of the machine has been correspondingly increased.

What we claim is:

1. A debarking machine comprising an annular stator, a hollow rotor journalled within the stator, shafts for debarking tools journalled in the rotor, equally spaced around the periphery thereof and extending therethrough substantially parallel to the axis of the rotor, debarking tools mounted on said shafts, at the inlet end of the rotor, resilient means connected to the shafts at the outlet side of the rotor to cause the tools to engage resiliently the surface of a log fed through the rotor, the interior wall of the rotor being widened conically onto the inlet end and rib-like bulges enclosing the shafts of the debarking tools and extending substantially axially from the smallest periphery of the conical wall.

2. A debarking machine comprising an annular stator, a hollow rotor journalled within the stator, shafts for debarking tools journalled in the rotor, equally spaced around the periphery thereof and extending therethrough substantially parallel to the axis of the rotor, debarking tools mounted on said shafts, at the inlet end of the rotor, resilient means connected to the shafts at the outlet side of the rotor to cause the tools to engage resiliently the surface of a log fed through the rotor, the interior wall of the rotor being widened conically at a cone angle of 70 to 100° and rib-like bulges enclosing the shafts of the debarking tools and extending substantially axially from the smallest periphery of the conical wall.

3. A debarking machine comprising an annular stator, a hollow rotor journalled within the stator, shafts for debarking tools journalled in the rotor, equally spaced around the periphery thereof and extending therethrough substantially parallel to the axis of the rotor, debarking tools mounted on said shafts, at the inlet end of the rotor, resilient means connected to the shafts at the outlet side of the rotor to cause the tools to engage resiliently the surface of a log fed through the rotor, the interior wall of the rotor being widened conically onto the inlet end and rib-like bulges extending substantially axially from the smallest periphery of the conical wall and enclosing the shafts of the debarking tools in such a way that said shafts lie within the greatest periphery of said conical wall.

4. A debarking machine as claimed in claim 1 and a substantially flat ring projecting radially from the outlet end of the rotor along the rear side of the stator, and a pulley carried by said ring radially outside the stator.

References Cited by the Examiner

UNITED STATES PATENTS

| | | |
|---|---|---|
| 314,876 | 3/85 | Poole et al. |
| 2,623,558 | 12/52 | Andersson _____ 144—208 |

FOREIGN PATENTS 593,635   3/60   Canada.

WILLIAM W. DYER, Jr., *Primary Examiner.*

LEON PEAR, *Examiner.*